Dec. 11, 1962   R. F. REIFERS   3,067,921
FOOD CONTAINER
Filed July 8, 1957   3 Sheets-Sheet 1
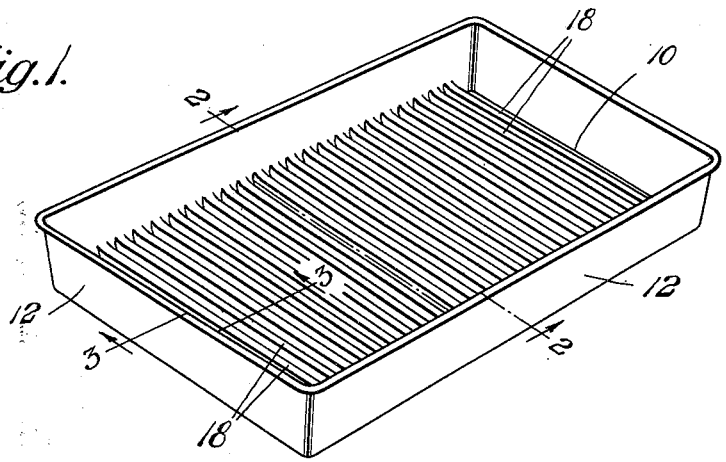
Fig. 1.
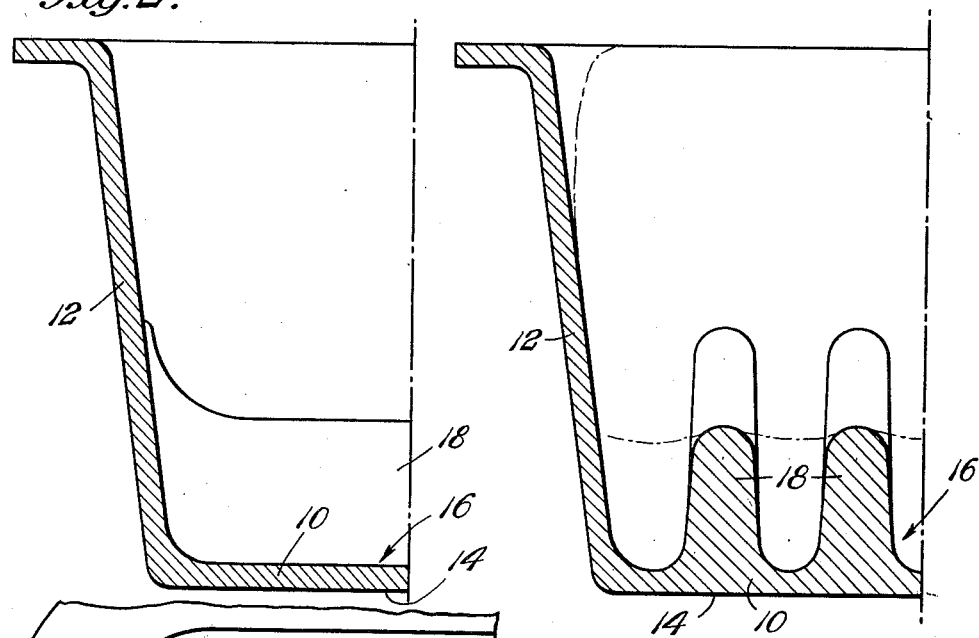
Fig. 2.
Fig. 3.
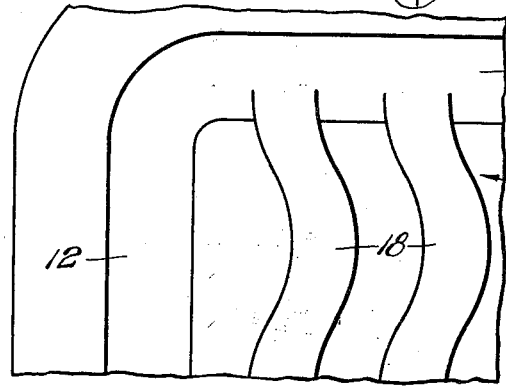
Fig. 10.
INVENTOR
Richard F. Reifers,
BY Karl W. Flocks
ATTORNEY

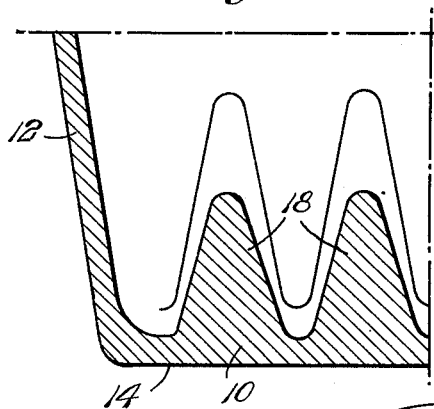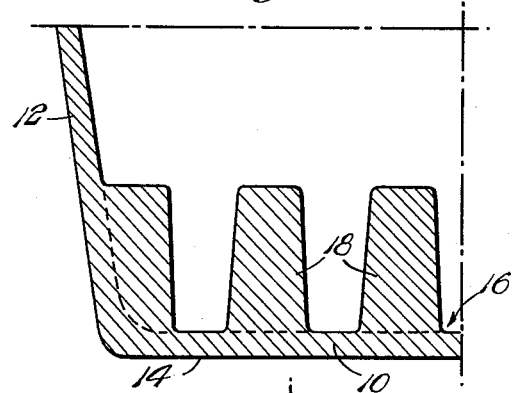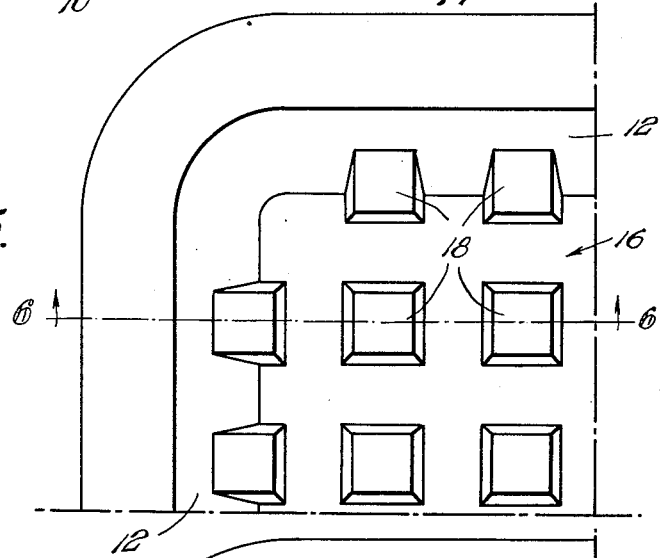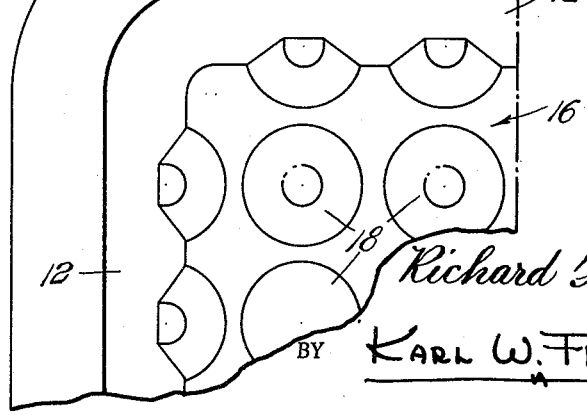

United States Patent Office 3,067,921
Patented Dec. 11, 1962

3,067,921
FOOD CONTAINER
Richard F. Reifers, Chicago, Ill., assignor to The Diamond National Corporation, a corporation of Delaware
Filed July 8, 1957, Ser. No. 670,546
6 Claims. (Cl. 229—2.5)

This invention relates to articles molded from plastic fibrous material such as wood pulp, and more particularly to a molded article formed as a container to hold meat.

In most meat markets today, the meat products are packaged for display and sale in a container made of wood pulp, usually covered by a sheet of cellophane which is heat sealed to the bottom surface of the container. Such containers are generally of a rectangular shape having upstanding side walls and a flat bottom surface adapted to receive the meat.

Such containers have been found to have several deficiencies which, until now, have not been corrected. One difficulty with such containers is that the meat to be packaged may be bloody or wet, and has a tendency to stick to the bottom surface of the container. When the meat is removed, the pulp of the container sticks onto it and in general the bottom surface of the meat is unsightly and discolored. Further, present containers have an excessive "draw" or weight loss of meat into the pulp surface due to the large area of contact. In addition, when the present containers are used for freezing meat, it is difficult to separate the meat and the container quickly.

It is therefore an object of the present invention to provide a food container particularly adapted for packaging meat products, which provide appreciably less contact area between the meat and the container.

It is a further object of the present invention to provide a meat container that is provided with a much smaller contact area between the meat and the container than presently used containers and yet provides an appreciable increase in the absorption area.

It is a still further object of the present invention to provide a meat container that yields less "draw" or weight loss of the meat into the pulp surface.

A still further object of the invention is to provide a meat container having an aerated bottom surface to give the meat a breathing surface.

It is a still further object of the present invention to provide a meat container having spaces between the meat and the container to permit ready defrosting of frozen meat.

A further object of the present invention is to provide a meat container with improved rigidity and stiffness and less bottom warpage during manufacturing and storage.

Figure 8:
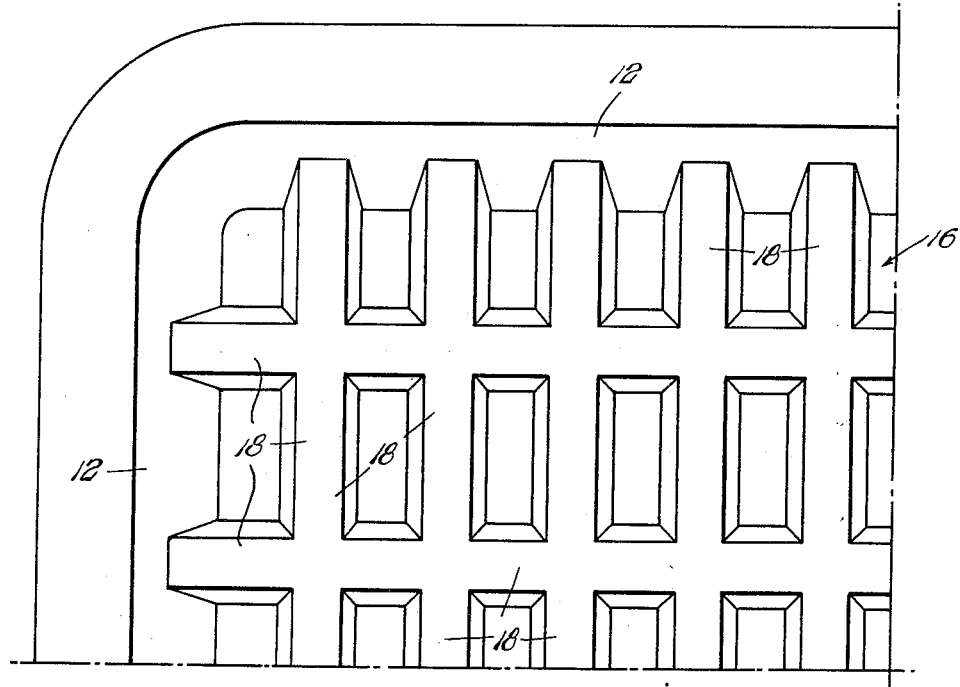
Figure 9:
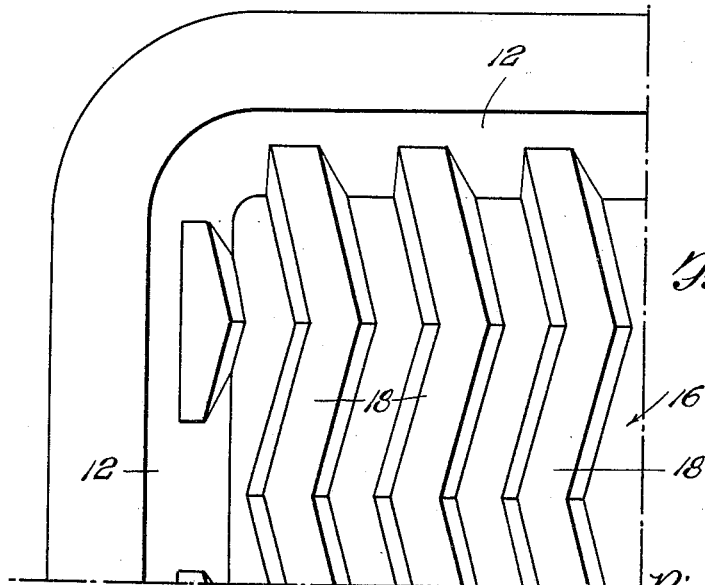

Other objects and the nature and advantages of the instant invention will be apparent from the following description taken in conjunction with the accompanying drawings, wherein:

FIG. 1 is a perspective view of one form of the invention;
FIG. 2 is a section along the line 2—2 of FIG. 1;
FIG. 3 is a section along the line 3—3 of FIG. 1;
FIG. 4 is a view similar to FIG. 3 showing triangular-shaped embossments;
FIG. 5 is a partial top plan view showing tapered square-shaped contact areas;
FIG. 6 is a section along the line 6—6 of FIG. 5;
FIG. 7 is a partial top plan view showing upstanding teats as the surface contact areas;
FIG. 8 is a view similar to FIG. 7 showing a honeycomb type structure;
FIG. 9 is a view similar to FIG. 7 showing a zig-zag ribbed arrangement; and
FIG. 10 is a view similar to FIG. 7 showing a sinusoidal ribbed arrangement.

As illustrated in the drawings, the food container in accordance with this invention comprises a bottom wall 10 and upstanding side walls 12 integral therewith. The bottom surface 14 of the bottom wall is flat, and the upper surface of the bottom wall is provided with a plurality of upstanding embossments 18. The particular configuration of the embossments 18 is not important provided certain critical limits are observed. As will be observed, the upper surfaces of the embossments 18 are the contact surfaces against which the meat products to be packaged will rest. It is imperative, to accomplish the objects of this invention, that the contact area of these upper contact surfaces be less than 50% of the total area of a horizontal projection of the bottom surface. Further, it is imperative that the bridging distance between the contact surfaces of adjacent embossments be less than 1/4". In addition, the total absorptive surface area must be more than two times the area of a horizontal projection of the bottom surface of the container.

When the term meat products is used in this specification and claims, it should be understood to include the flesh of animals, fowl and fish.

In use, when the meat products are placed in a container in accordance with this invention, the meat will rest on the contact areas only, permitting dripping of blood, water or other juices into the absorption spaces between the embossments. Further, air separates the meat from these absorption spaces yielding an aerated bottom structure that gives the meat a breathing surface to prolong its color life. In cases where the meat is home frozen in the container, the small contact areas will make it much easier to remove the meat because it is now possible to run cold or warm water between the meat and the container for quick separation.

Various pulp containers have been proposed heretofore having embossments on the bottom surface thereof for various purposes, such as for example Design Patent #D-105,700; however, it has been found that these are not acceptable for meat containers. This is due to these containers not meeting the critical limits which have been discovered to be essential to accomplish the objects of this invention. When the bridging dimensions between adjacent contact surfaces are over the critical dimension of 1/4", as in the case in the Design Patent #D-105,700, the meat will be found to fall between adjacent embossments and to be in 100% contact with the bottom surface of the container. Further, the bottom surface 14 of the bottom wall of the container must be flat to permit of heat sealing of a sheet of cellophane or the like thereto. This is not possible where embossments are also located on the lower bottom surface.

Referring to the drawings, FIG. 1 shows an example of the invention wherein the embossments extend continuously across the bottom of the container from side wall to side wall with the embossments extending upwardly into the bottom curve of the side wall. This construction has many advantages, particularly with respect to added rigidity and increased stiffness of the side walls. The distance the embossments extend upwardly into the side wall is limited by the desired nesting property of the container.

This invention results in a container that can be nested together with a positive nesting interval provided with less frictional resistance, so that the containers can be unnested readily in automatic dispensers.

The form of the invention shown in FIG. 1 is particularly suitable for use in home freezing due to the channels of absorptive surface extending from side wall to side wall which can be used to convey a defrosting liquid between the meat and the container for quick separation.

The greatly increased absorptive surface area results in quick absorption capacity for free liquids on the meat. Further, the aerated bottom arrangement resulting gives the meat a breathing surface and protects its color life.

The shape of the embossments may be varied as desired within the critical limits specified. The continuous embossments across the container shown in FIG. 1 may be varied in cross-section such as rounded, square, trapezoidal or triangular, as shown in the drawings. The embossments may extend across the plate or along diagonal lines, either straight, curved, zig-zag or the like.

The embossments may be in the shape of a plurality of individual upstanding posts, as illustrated, having any desired shape, with a rounded or flat upper surface, preferably tapered from the base upwardly. Other forms such as waffle patterns to various honeycomb shapes may also be used.

As shown in the drawings, embossments in the form of continuous ribs extending from side wall to side wall are shown in FIGS. 1, 9 and 10. In FIG. 1, the ribs extend in a straight line across the container, although it should be noted that the ribs could just as well extend lengthwise of the container. In FIG. 9, the ribs are arranged in a zig-zag pattern, whereas in FIG. 10 the ribs are arranged in a somewhat sinusoidal arrangement.

The ribs of FIG. 1 are shown to be rounded at their upper and lower surfaces. The ribs shown in FIG. 4 are triangular in cross-section.

The embossments illustrated in FIG. 5 are a plurality of upstanding posts that are square in cross-section and tapered to a relatively small bearing surface area. The embossments illustrated in FIG. 7 are upstanding posts that are teat-shaped.

As heretofore stated, the shape of the embossments is not important provided the following critical limits are met:

(1) The bridging distance between adjacent surface contacting areas must be less than ¼", (2) The surface contact area between the meat and the pulp must be less than 50% of the area of a horizontal projection of the bottom surface of the container, and (3) The total absorptive surface area of the bottom surface of the container must be more than two times the area of a horizontal projection of the bottom surface of the container.

When these critical limits are met, a container is obtained that is especially suitable for meat products. The container provided with such embossments has less bottom warpage in manufacturing and storage and is highly rigid. The flat underneath of the container will give good heat sealing performance whether automatic or hand-operated.

It will be obvious to those skilled in the art that various changes may be made without departing from the spirit of the invention and therefore the invention is not limited to what is shown in the drawings and described in the specification but only as indicated in the appended claims.

What is claimed is:

1. A food container of pulp material adapted for the packaging of meat, comprising a bottom wall and side walls, said bottom wall having a flat bottom surface and an upper absorptive surface provided with a plurality of upstanding embossments defining absorption spaces therebetween, the upper surfaces of said embossments serving as surface contact areas for the meat, said absorption spaces serving to absorb any liquid dripping from the meat, said total surface contact area being less than 50% of the area of a horizontal projection of the bottom wall of the container, the bridging distance between adjacent surface contact areas being less than ¼", and the total surface area of the upper surface of said bottom wall being more than two times the area of a horizontal projection of the bottom wall of the container.

2. A food container in accordance with claim 1, wherein said embossments and said contact areas extend continuously across the container from side wall to side wall.

3. A food container in accordance with claim 2, wherein said embossments extend upwardly at each side wall into the bottom curve joining the side wall and the bottom wall.

4. A food container in accordance with claim 1, wherein said embossments constitute a plurality of upstanding posts.

5. A food container in accordance with claim 4, wherein said upstanding posts are tapered upwardly so as to have a smaller upper contact area than the base of said post.

6. A food container in accordance with claim 1, wherein said embossments form a honeycomb structure.

References Cited in the file of this patent

UNITED STATES PATENTS

| | | |
|---|---|---|
| 313,092 | Mayes | Mar. 3, 1885 |
| 1,865,742 | Chapman | July 5, 1932 |
| 2,026,286 | Samuels | Dec. 31, 1935 |
| 2,673,003 | Stewart | Mar. 23, 1954 |
| 2,681,001 | Smith | June 15, 1954 |